United States Patent
Aaltonen et al.

(10) Patent No.: US 10,241,636 B2
(45) Date of Patent: *Mar. 26, 2019

(54) USER INTERFACE FOR COLLECTING CRITERIA AND ESTIMATING DELIVERY PARAMETERS

(71) Applicant: Apple Inc., Cupertino, CA (US)

(72) Inventors: Janne Aaltonen, Turku (FI); Timo Ahopelto, Helsinki (FI); Ismo Antikainen, Masala (FI)

(73) Assignee: Apple Inc., Cupertino, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 15/069,164

(22) Filed: Mar. 14, 2016

(65) Prior Publication Data
US 2016/0274740 A1    Sep. 22, 2016

Related U.S. Application Data

(60) Continuation of application No. 13/924,460, filed on Jun. 21, 2013, now abandoned, which is a division of
(Continued)

(30) Foreign Application Priority Data

Apr. 5, 2007 (GB) .................................. 0706814.1

(51) Int. Cl.
*H04W 4/00* (2018.01)
*H04W 4/50* (2018.01)
(Continued)

(52) U.S. Cl.
CPC ........... *G06F 3/0481* (2013.01); *G06Q 30/08* (2013.01); *H04L 12/1471* (2013.01);
(Continued)

(58) Field of Classification Search
CPC .................. H04L 12/14; H04L 12/147; H04L 12/1432–12/1439; H04L 41/147; G06F 2201/875
See application file for complete search history.

(56) References Cited

U.S. PATENT DOCUMENTS 5,613,213 A    3/1997  Naddell et al.
5,768,521 A    6/1998  Dedrick
(Continued)

FOREIGN PATENT DOCUMENTS

AU    2004200332 A1    1/2004
BE    1015704          7/2005
(Continued)

OTHER PUBLICATIONS

PCT Written Opinion of the International Searching Authority for PCT/EP2008/052177, dated May 11, 2008, 11 pages.
(Continued)

*Primary Examiner* — Jennifer N To
*Assistant Examiner* — Liang Y Li
(74) *Attorney, Agent, or Firm* — Womble Bond Dickinson (US) LLP

(57) ABSTRACT

The present invention relates generally to a method of identifying data delivery parameters relating to delivery of data accessible from a network location via a communications service provider. Embodiments of the invention are particularly well suited to identifying delivery parameters when the delivery of data is metered, such as when data are delivered to terminals connected to mobile networks.

24 Claims, 6 Drawing Sheets

| URL (entered in region 301) | Data amount (entered in region 301 (or verified)) | Selected Operators (output of evaluation process) | Keywords and content (entered in region 303) | Bid Criteria (entered in region 303) | Resource Available for delivery (account balance; entered in region 303) |
|---|---|---|---|---|---|
| www.cars1.com | File size: 20 Kbyte; 5 click-through links | Orange, T-Mobile | Cars, Engines, Motorbikes  Information only | Plan 1: 1€ | X |
| www.cars2.com | File size: 2 MB | Vodafone, Cingular | Driving, cars  Music and information | Plan 2: 0.2€ | Y |
| www.cars3.com | File size: 10 MB | None | Race replicas, motorbikes  Video and information | Plan 3: 0.3€ | Z |

Related U.S. Application Data application No. 12/019,338, filed on Jan. 24, 2008, now Pat. No. 8,473,614.

(51) Int. Cl.

| | | |
|---|---|---|
| G06Q 30/08 | (2012.01) | |
| H04L 12/14 | (2006.01) | |
| H04L 12/24 | (2006.01) | |
| H04L 29/08 | (2006.01) | |
| H04M 15/00 | (2006.01) | |
| H04M 17/00 | (2006.01) | |
| G06F 3/0481 | (2013.01) | |

(52) U.S. Cl.
CPC .............. *H04L 41/22* (2013.01); *H04L 67/06* (2013.01); *H04M 15/00* (2013.01); *H04M 15/58* (2013.01); *H04M 17/00* (2013.01); *H04W 4/00* (2013.01); *H04W 4/50* (2018.02); *H04M 2215/0192* (2013.01); *H04M 2215/204* (2013.01); *H04M 2215/2013* (2013.01)

(56) References Cited

U.S. PATENT DOCUMENTS

| | | | |
|---|---|---|---|
| 5,978,775 | A | 11/1999 | Chen |
| 5,978,833 | A | 11/1999 | Pashley et al. |
| 6,035,281 | A | 3/2000 | Crosskey et al. |
| 6,078,866 | A | 6/2000 | Buck et al. |
| 6,250,557 | B1 | 6/2001 | Forslund et al. |
| 6,269,361 | B1 | 7/2001 | Davis et al. |
| 6,334,145 | B1 | 12/2001 | Adams et al. |
| 6,408,309 | B1 | 6/2002 | Agarwal |
| 7,200,633 | B2 | 4/2007 | Sekiguchi et al. |
| 7,406,307 | B2 | 7/2008 | Manto |
| 7,428,555 | B2 | 9/2008 | Yan |
| 7,668,950 | B2 | 2/2010 | Horowitz et al. |
| 7,676,405 | B2 | 3/2010 | Steelberg et al. |
| 7,764,947 | B2 | 7/2010 | Koskinen et al. |
| 7,818,284 | B1 | 10/2010 | Walker |
| 7,974,988 | B2 | 7/2011 | Nandiwada et al. |
| 7,991,140 | B2 | 8/2011 | Pines et al. |
| 8,099,490 | B2 | 1/2012 | Deakin |
| 2002/0006803 | A1 | 1/2002 | Mendiola et al. |
| 2002/0019829 | A1 | 2/2002 | Shapiro |
| 2002/0075305 | A1 | 6/2002 | Beaton et al. |
| 2002/0111848 | A1 | 8/2002 | White |
| 2002/0138291 | A1 | 9/2002 | Vaidyanathan et al. |
| 2002/0177431 | A1 | 11/2002 | Hamilton et al. |
| 2002/0188487 | A1 | 12/2002 | Fox |
| 2003/0040297 | A1 | 2/2003 | Pecen et al. |
| 2003/0126015 | A1 | 7/2003 | Chan et al. |
| 2003/0197719 | A1 | 10/2003 | Lincke et al. |
| 2003/0200059 | A1* | 10/2003 | Ignatowski ......... G06F 11/3419 702/186 |
| 2004/0093289 | A1 | 5/2004 | Bodin |
| 2004/0203851 | A1 | 10/2004 | Vetro et al. |
| 2004/0204133 | A1 | 10/2004 | Andrew et al. |
| 2004/0209649 | A1 | 10/2004 | Lord |
| 2004/0259526 | A1 | 12/2004 | Goris et al. |
| 2005/0125397 | A1 | 6/2005 | Gross et al. |
| 2005/0160002 | A1 | 7/2005 | Roetter et al. |
| 2005/0177506 | A1 | 8/2005 | Rissanen |
| 2005/0213514 | A1* | 9/2005 | Su .................... H04L 41/142 370/254 |
| 2005/0222949 | A1 | 10/2005 | Inotay et al. |
| 2005/0228680 | A1 | 10/2005 | Malik |
| 2005/0239504 | A1 | 10/2005 | Ishii et al. |
| 2005/0240475 | A1 | 10/2005 | Margiloff et al. |
| 2005/0273465 | A1 | 12/2005 | Kimura |
| 2005/0281237 | A1 | 12/2005 | Heinonen et al. |
| 2006/0026067 | A1 | 2/2006 | Nicholas et al. |
| 2006/0048059 | A1 | 3/2006 | Etkin |
| 2006/0068845 | A1 | 3/2006 | Muller et al. |
| 2006/0117378 | A1 | 6/2006 | Tam et al. |
| 2006/0123014 | A1 | 6/2006 | Ng |
| 2006/0184504 | A1 | 8/2006 | Taylor |
| 2006/0200460 | A1 | 9/2006 | Meyerzon et al. |
| 2006/0240850 | A1 | 10/2006 | Kaplan |
| 2006/0271438 | A1 | 11/2006 | Shotland et al. |
| 2006/0286963 | A1 | 12/2006 | Koskinen et al. |
| 2006/0286964 | A1 | 12/2006 | Polanski et al. |
| 2006/0288124 | A1 | 12/2006 | Kraft et al. |
| 2007/0050372 | A1 | 3/2007 | Boyle |
| 2007/0060099 | A1 | 3/2007 | Ramer et al. |
| 2007/0060109 | A1 | 3/2007 | Ramer et al. |
| 2007/0066295 | A1 | 3/2007 | Wennberg et al. |
| 2007/0074262 | A1 | 3/2007 | Kikkoji et al. |
| 2007/0100805 | A1 | 5/2007 | Ramer et al. |
| 2007/0140214 | A1 | 6/2007 | Zoltan |
| 2007/0150388 | A1 | 6/2007 | Mendiratta |
| 2007/0162328 | A1 | 7/2007 | Reich |
| 2007/0174124 | A1 | 7/2007 | Zagofsky et al. |
| 2007/0244750 | A1 | 10/2007 | Grannan et al. |
| 2007/0271134 | A1 | 11/2007 | Ferry et al. |
| 2008/0057917 | A1 | 3/2008 | Oria |
| 2008/0065474 | A1 | 3/2008 | Sharma et al. |
| 2008/0065491 | A1 | 3/2008 | Bakman |
| 2008/0103895 | A1 | 5/2008 | Burdick et al. |
| 2008/0201746 | A1 | 8/2008 | Howcraft |
| 2008/0221989 | A1 | 9/2008 | Messer et al. |
| 2008/0228893 | A1 | 9/2008 | MacDonald et al. |
| 2008/0249850 | A1 | 10/2008 | Szybalski et al. |
| 2008/0263460 | A1 | 10/2008 | Altberg et al. |
| 2008/0306820 | A1 | 12/2008 | Passmore |
| 2009/0037239 | A1 | 2/2009 | Wong et al. |
| 2009/0043644 | A1 | 2/2009 | Wilkman |
| 2009/0106100 | A1 | 4/2009 | Mashinsky |
| 2009/0199107 | A1 | 8/2009 | Lewis et al. |
| 2009/0222316 | A1 | 9/2009 | Boinepalli et al. |
| 2009/0276317 | A1 | 11/2009 | Dixon et al. |
| 2009/0282052 | A1 | 11/2009 | Evans et al. |
| 2010/0082401 | A1 | 4/2010 | Vee et al. |
| 2010/0082439 | A9 | 4/2010 | Patel et al. |
| 2010/0106606 | A1 | 4/2010 | Filice et al. |
| 2010/0121694 | A1 | 5/2010 | Bharadwaj et al. |
| 2010/0131352 | A1 | 5/2010 | Malhotra et al. |

FOREIGN PATENT DOCUMENTS

| | | | |
|---|---|---|---|
| DE | 19941461 | 3/2001 | |
| DE | 200 08 040 U1 | 3/2005 | |
| DE | 20008040 U1 * | 3/2005 | ............. H04L 12/14 |
| DE | 20008040 U1 * | 3/2005 | ............. H04L 12/14 |
| EP | 1003344 | 5/2000 | |
| EP | 1109371 | 6/2001 | |
| EP | 1182845 | 2/2002 | |
| EP | 1280087 | 1/2003 | |
| EP | 1303107 | 4/2003 | |
| EP | 1320214 | 6/2003 | |
| EP | 1528827 | 5/2005 | |
| EP | 1594287 | 11/2005 | |
| EP | 1633100 | 3/2006 | |
| EP | 1772822 | 4/2007 | |
| GB | 2372867 | 9/2002 | |
| GB | 2414621 | 11/2005 | |
| JP | 2002140272 | 5/2002 | |
| WO | WO 98/36585 | 8/1998 | |
| WO | WO 00/52621 | 9/2000 | |
| WO | WO 01/22748 | 3/2001 | |
| WO | WO 01/31497 | 5/2001 | |
| WO | WO 01/33797 | 5/2001 | |
| WO | WO 01/43416 A2 | 6/2001 | |
| WO | WO 01/44977 | 6/2001 | |
| WO | WO 01/57705 | 8/2001 | |
| WO | WO 01/63423 | 8/2001 | |
| WO | WO 01/65411 | 9/2001 | |
| WO | WO 01/71949 | 9/2001 | |
| WO | WO 01/91021 | 11/2001 | |
| WO | WO 02/30133 | 4/2002 | |
| WO | WO 02/41178 | 5/2002 | |
| WO | WO 02/44989 | 6/2002 | |
| WO | WO 02/069585 | 9/2002 | |
| WO | WO 02/071628 | 9/2002 | |

(56) References Cited

FOREIGN PATENT DOCUMENTS

| WO | WO 02/096026 | 11/2002 |
|---|---|---|
| WO | WO 02/096056 | 11/2002 |
| WO | WO 03/015430 | 2/2003 |
| WO | WO 03/024136 | 3/2003 |
| WO | WO 03/058524 | 7/2003 |
| WO | WO 2003/058458 | 7/2003 |
| WO | WO 2003/073304 | 9/2003 |
| WO | WO 2004/100470 | 11/2004 |
| WO | WO 2005/029769 | 3/2005 |
| WO | WO 2005/073863 | 8/2005 |
| WO | WO 2006/011164 | 2/2006 |
| WO | WO 2006/024003 | 3/2006 |
| WO | WO 2006/119481 | 11/2006 |
| WO | WO 2006/122042 | 11/2006 |
| WO | WO 2007/002025 | 1/2007 |
| WO | WO 2007/031708 | 3/2007 |
| WO | WO 2007/060451 | 5/2007 |
| WO | WO 2007/091089 | 8/2007 |
| WO | WO 20101018584 | 2/2010 |

OTHER PUBLICATIONS

PCT International Preliminary Report on Patentability for PCT/EP2008/052177, dated Oct. 6, 2009, 12 pages.
ETSI TS 100900 V7.2.0 (Jul. 1999), Digital Cellular Telecommunication System (Phase 2+); Alphabets and language-specific information (GSM 03.38 Version 7.2.0 Release 1998), European Telecommunications Standards Institute 1999.
European Search Report dated May 23, 2008, European Patent Application No. 08101226.
Examination Report under section 18(3), dated Jan. 23, 2009, issued in related UK Application No. GB 0802989.4, 5 pages.
Extended European search Report dated Mar. 17, 2008, European Application No. 08101544.8.
Office Action dated Feb. 18, 2011 issued by the USPTO, Related U.S. Appl. No. 12/288,690, 38 pages.
Office Action dated Mar. 31, 2011, issued in Related U.S. Appl. No. 12/290,140.
Office Action dated Oct. 19, 2010, USPTO in related U.S. Appl. No. 12/290,140, 11 pages.
PCT International Search Report from PCT International, searching Authority dated May 8, 2009 in a related PCT Application No. PCT/EP2009/050144, 4 pages.
U.K. Search Report under Section 17 dated Jun. 4, 2008, U.K. Application No. G80803468.8.
UKIPO Search Report dated May 30, 2008, UK Application No. G80802175.
United Kingdom Search Report dated Sep. 17, 2007, United Kingdom Patent Application No. G80709331.3.
WAG UAProf Version Oct. 20, 2001; Wireless Application Protocol, WAP-248-UAPROF-20011020-a, Wireless Application Protocol Forum, Ltd. (2001); http://www.wapforum.org/what/copyright.htm.
PCT International Search Report for PCT/EP2008/052177 dated May 11, 2008, 5 pages.
International Preliminary Report on Patentability and Written Opinion of the International Searching Authority, dated Nov. 24, 2009 in International Application PCT/WO2008/002897.
International Search Report and Written Opinion of the International Searching Authority (Form PCT/ISA/237), dated Jan. 22, 2009 in related International Application No. PCT/EP2008/057438.

\* cited by examiner

| URL (entered in region 301) | Data amount (entered in region 301 (or verified)) | Selected Operators (output of evaluation process) | Keywords and content (entered in region 303) | Bid Criteria (entered in region 303) | Resource Available for delivery (account balance; entered in region 303) |
|---|---|---|---|---|---|
| www.cars1.co m | File size: 20 Kbyte; 5 click-through links | Orange, T-Mobile | Cars, Engines, Motorbikes<br>Information only | Plan 1: 1€ | X |
| www.cars2.co m | File size: 2 MB | Vodafone, Cingular | Driving, cars<br>Music and information | Plan 2: 0.2€ | Y |
| www.cars3.co m | File size: 10 MB | None | Race replicas, motorbikes<br>Video and information | Plan 3: 0.3€ | Z |

Ra →
Rb →
Rc →

Fig. 5 ated on Jan. 24, 2008, now issued as U.S. Pat. No. 8,473,
USER INTERFACE FOR COLLECTING CRITERIA AND ESTIMATING DELIVERY PARAMETERS This application is a continuation of co-pending U.S. application Ser. No. 13/924,460 filed on Jun. 21, 2013, which is a divisional of U.S. application Ser. No. 12/019,338 filed on Jan. 24, 2008, now issued as U.S. Pat. No. 8,473,614, which relies for priority under 35 U.S.C. § 119 upon Great Britain Application Serial No. GB0706814.1, filed on Apr. 5, 2007, which are incorporated herein by reference.

FIELD OF THE INVENTION

The present invention relates generally to a method of identifying data delivery parameters relating to delivery of data accessible from a network location via a communications service provider, and is particularly, but not exclusively, suited to identifying delivery parameters when the delivery of data is metered, such as when data are delivered to terminals connected to mobile networks.

BACKGROUND OF THE INVENTION

As is well known, search engines such as those provided by Google™ and Yahoo™ use "web crawlers" to locate new or modified data in the form of web pages that are accessible via the World Wide Web. The content of these pages is analyzed, keywords are extracted from the pages, and the keywords are added to a search index, which links to a list of web pages that contain a particular word. A weight or rank for the web page can be generated on the basis of the number of times that word occurs on the web page, and stored in the index. A variety of other parameters can be factored into the web-page rank, including the number of times other search users have clicked on the link to that web page, how extensively that web page is linked to from other web pages, personal reviews and ratings of web pages or sites, or on the basis of an amount that a given web site is willing to pay for a particular ranking. Web pages can include data relating to products and services, and can thus serve as a medium for advertising.

As described in U.S. Pat. No. 6,269,361, web site promoters can control their placement in search result listings so that their listings are prominent in searches that are relevant to the content of their web site. This is achieved by means of an on-line marketplace, in which companies selling products, services, or information bid in an open auction environment for positions on a search result list generated by an Internet search engine. Since content providers must pay for each click-through referral generated through the search result lists generated by the search engine, there is an incentive to select and bid on those search keywords that are most relevant to their web site offerings. In known systems implementing this approach, content providers typically input the search keywords and bid criteria via a user interface, the user interface being operated under the control of the search facility so that data entered by the content providers can subsequently be used to rank search results on the basis of their bids.

Use of search engines to find data of interest is currently not in question because in most cases search queries are received from terminals that are fixedly connected to the Internet (either directly, or via one or several network portions), and of course the transmission of data within the Internet—on a per request basis—is free. However, with the advent of widespread deployment of radio networks such as cellular and non-cellular networks (using e.g. Global System for Mobile Communications (GSM) technology, Wideband Code Division Multiplex Access (WCDMA); Code Division Multiplex Access (CDMA), Worldwide Interoperability for Microwave Access (WiMax)) and/or unlicensed network portions (such as Wireless LANs and Bluetooth technologies), search requests are increasingly being received from terminals connected to wireless networks. Unlike the transmission of data within fixed-line networks, the transmission of data within mobile networks is typically metered on a per transmission basis. As a result, mobile terminals are faced with hitherto unseen costs for accessing sites on the basis of search results generated by search engines, which calls into question the likely take-up of search engine offerings by users of personal mobile devices.

In order to increase the likelihood of users accessing data relating to search results it would be attractive to involve the content providers in the delivery of data.

SUMMARY

In accordance with aspects of the present invention, there is provided method and a system according to the appended claims.

Embodiments of the invention are particularly convenient for use in arranging for delivery of content to a terminal connected to a mobile communications network.

In accordance with further aspects of the invention there is provided a distributed system for carrying out the method steps, including a user interface adapted to collect criteria to be used in determining the delivery of said content.

Further features and advantages of the invention will become apparent from the following description of preferred embodiments of the aspects of the invention, given by way of example only, which is made with reference to the accompanying drawings. It is to be understood that other embodiments may be utilized and structural and functional modifications may be made without departing from the scope and spirit of the present invention.

BRIEF DESCRIPTION OF THE DRAWINGS

FIG. 5 is a schematic diagram showing fields of several records stored within the database shown in FIG. 1.

DETAILED DESCRIPTION OF THE INVENTION

Embodiments of the present invention are concerned with providing a means for collecting criteria relating to delivery and characteristics of data that are accessible via communications networks from content providers. Embodiments of the invention are concerned with processing the various characteristics on the basis of delivery constraints so as to estimate delivery parameters for the data. The nature of these processes is described in detail below, but first a description of the infrastructure needed to support some embodiments of the invention will be presented.

Figure 1:
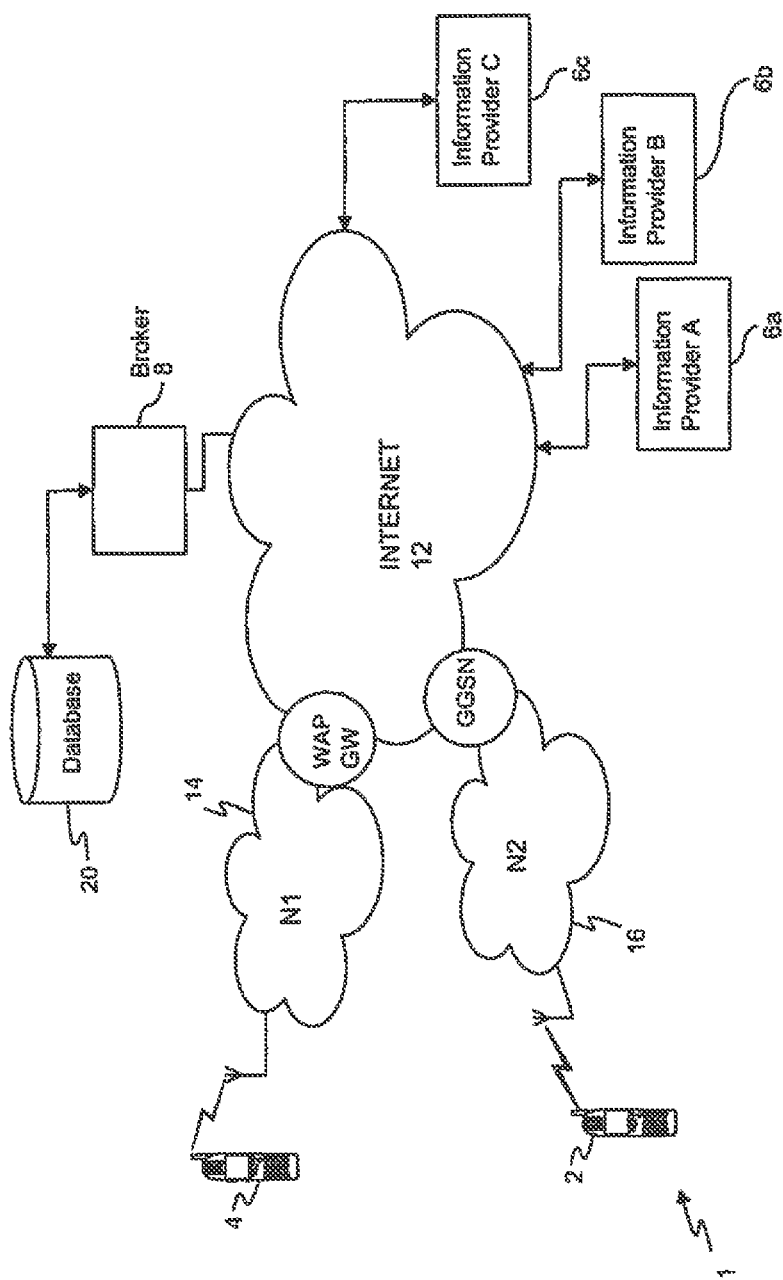
FIG. 1 is a schematic block diagram showing a distributed information system within which embodiments of the invention can operate.

FIG. 1 shows an example of a distributed information system 1 within which some embodiments of the invention operate; the distributed system 1 comprises a plurality of content providers 6a, 6b, 6c, at least some of which are arranged to store content and information, a content broker 8, and a database 20, all of which are connected to a network 12 either directly or indirectly (e.g. via the Internet, local area networks (LANs), other wide area networks (WANs), and regional networks accessed over telephone lines, such as commercial information services).

As shown in FIG. 1, each of the terminals 2, 4 is connected to a different network N1, N2, meaning that the delivery path for data accessed from the first terminal 2 involves network portions different to those associated with the delivery path for data accessed by the second terminal 4. In one arrangement it is envisaged that each of network portions N1, N2 relates to a respective service provider, each having a proprietary set of delivery parameters specifying a cost of delivery of a certain amount of data associated therewith (e.g. as a function of number of data access attempts within a given period). Examples of network portions N1, N2 include mobile networks, and in this specification, mobile networks are used to exemplify embodiments of the invention.

Mobile terminals 2, 4 are adapted to communicate with the various content providers 6a, 6b, 6c via mobile network 14 and appropriate gateways WAP GW, GPRS support node (GGSN) as shown; the terminals 2, 4 can be mobile telephones or PDAs, lap top computers and the like, and the mobile network 14 can comprise licensed (such as cellular networks using e.g. Global System for Mobile Communications (GSM) technology, Wideband Code Division Multiplex Access (WCDMA); Code Division Multiplex Access (CDMA), Worldwide Interoperability for Microwave Access (WiMax)) and/or unlicensed network portions (such as Wireless LANs and Bluetooth technologies) and/or broadcasting networks (such as Digital Video Broadcasting (DVB-H), MediaFlo, Terrestrial Integrated Services Digital Broadcasting (ISDB-T), Digital Multimedia Broadcasting (DMB)).

The mobile terminals 2, 4 can comprise browser programs adapted to locate, and access data from, web sites corresponding to the or each content provider 6a, 6b, 6c. The browser programs allow users of the terminals 2, 4 to enter addresses of specific web sites, typically in the form of Uniform Resource Locators, or URLs, and are typically adapted to receive and display web and WAP pages; in the event that a given terminal 2 is only capable of processing and displaying WAP pages, translation of a web page can be performed by a device in the network or by suitable translation software running on the device 2. As is known in the art, any given web page can include links nested therein, which, when selected, can provide access to other pages or data such as plain textual information, or digitally encoded multimedia content, such as software programs, audio signals, videos graphics, etc. Accordingly selection of such links results in transmission of further data to the terminals 2, 4.

Embodiments of the invention may enable any given content provider 6a to evaluate, and thence elect, particular service providers as being authorised to deliver content to terminals 2, 4; data relating to those service providers authorised to transport data are stored as records in the database 20 for use in evaluating delivery costs and the like in response to receipt of a request for data access from the content providers.

Figure 2:
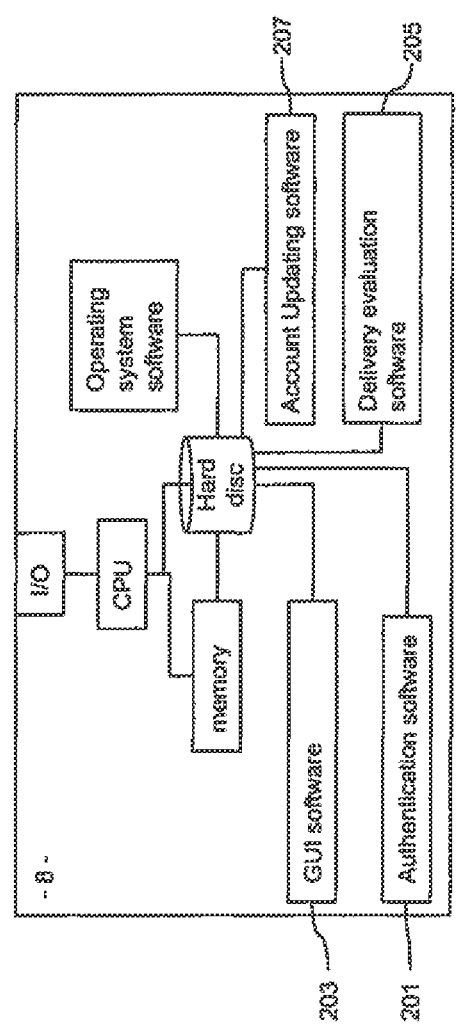
FIG. 2 is a schematic diagram showing components of the content broker shown in FIG. 1.

In one arrangement the content broker 8 is preferably embodied as a web server, and provides an interface to the database 20 via which the content providers 6a, 6b, 6c can submit criteria controlling access to their content and information, in particular when they are referenced in response to a search request received from one of the terminals 2, 4. As can be seen from FIG. 2, the content broker 8 comprises standard operating system, storage, Input/Output, processor and memory components, and bespoke software components in the form of authentication software component 201, Graphical User Interface (GUI) software component 203, delivery evaluation software component 205 and account updating software component 207.

The authentication software component 201 may comprise a firewall, not shown, which receives and authenticates requests from the content providers 6a, 6b, 6c, typically from a web browser, and is arranged to protect the GUI software component 203 and information stored in the database 20 from unauthorised access. Additional security may be provided via enhancements to the standard communications protocols such as Secure Hyper Text Transfer Protocol (HTTPS) or the Secure Sockets Layer (SSL).

Figure 3:
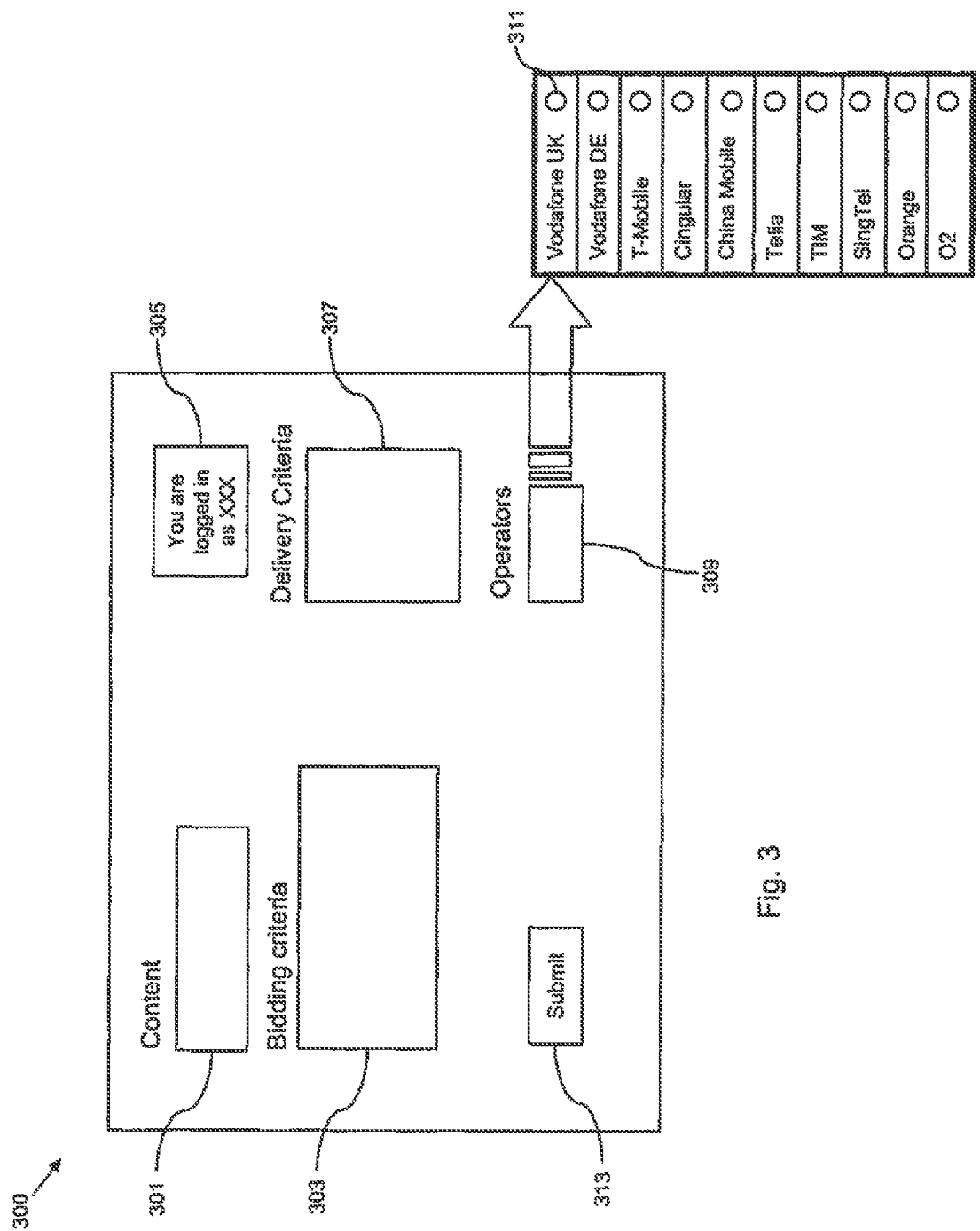
FIG. 3 is a schematic diagram showing a user interface for use in collecting content and delivery criteria from the content providers shown in FIG. 1.
Figure 4:
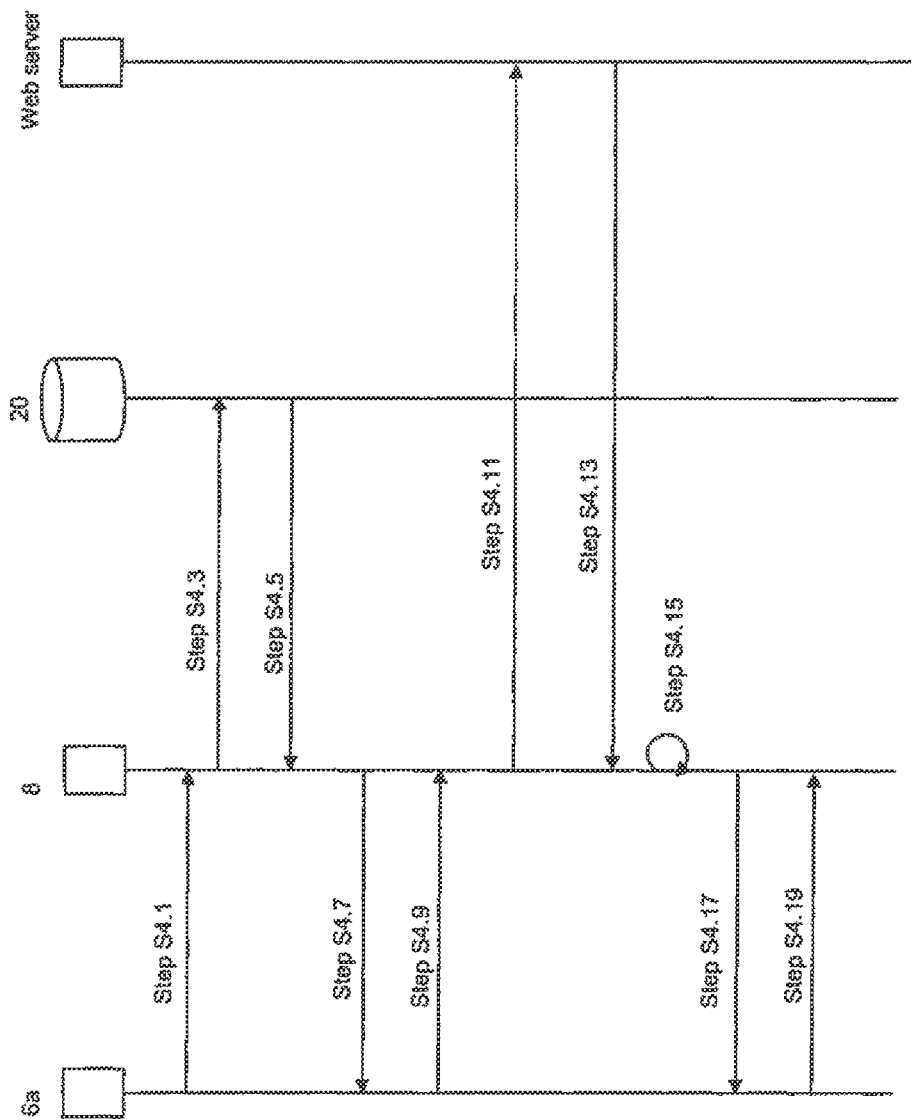
FIG. 4 is a schematic flow diagram showing steps associated with collecting data for use in identifying network operators in respect of which transmission of data to subscribers can be sponsored.

The GUI software component 203 is arranged to invoke and display a user interface 300 of the form shown in FIG. 3, which comprises a plurality of editable regions 301, 303, 307, 311, and is configured to receive data input by or on behalf of an authorised content provider 6a. The GUI software component 203 is triggered by the authentication software component 201 upon successful authentication of the requesting content provider 6a, 6b, 6c. With reference to FIGS. 3 and 4, once the requesting content provider 6a has been authenticated (step S4.1), the user interface 300 is sent (e.g. in the form of a web page) and displayed to the content provider 6a, with the identity of the content provider being displayed in region 305 (step S4.7). The editable region 30 1 is for data specifying the content that is accessible from the content provider's network location(s), together with the corresponding network location(s) (specified, e.g. by means of a Universal Resource Indicator (URI)). In addition, region 301 includes a field for specifying the amount of data that is accessible from the or each network location; the data amount is preferably specified in number of Bytes, and can be verified by the content broker 8 during post-processing of the entered data (e.g. when checking the URI, as described below).

Editable region 303 is for data specifying the criteria which, when entered by a user as part of a request for data access (e.g. a search request for documents or a search request for media data such as video, music and the like), will result in the content provider being included in a list of results provided to the user. The criteria thus include keywords, artists, film names etc., as appropriate to the content identified in region 301, together with an amount of resource (such as money) that the content provider is willing to bid in order to influence their position in the list of results. As described in detail below, these criteria are then stored in the database 20, and can be used when performing processes such as responding to search requests.

As is known in the art, the list of results can comprise a list of URLs: each URL on the list corresponds to a network location associated with a given content provider and in embodiments of the invention the content provider can sponsor all or part of the delivery of their content to the user, together with the conditions under which such sponsorship is to be provided are entered in region 307. Examples of such conditions include (but are not limited to):

Particular access technologies for delivery (e.g. SMS, WAP, Internet, WLAN, 20, 30—delivery sponsored or not);

Roaming, as a function of network operator (delivery sponsored or not);

Delivery plans to be supported, as a function of network operator;

Specified time periods for sponsored delivery;

Specified number of access requests (per user);

Specified amount of delivery sponsorship (per user and/or per access request)

Specified type of content from network location to be sponsored;

Specified budget to be used for sponsoring delivery (in total and/or per delivery event);

Number of click-through links from which content can be provided and in respect of which delivery will be sponsored.

The content provider 6a can also select, from a list of available network operators, those operators in relation to whom the sponsorship conditions apply, thereby effectively filtering out certain users from sponsorship of content delivery. In one arrangement the operators can be selected from a drop-down list of all available operators by means of buttons 311, the drop-down list being invoked by clicking on region 309; though not shown in the Figure, various operator-specific parameters can be displayed to the user to help with the selection process (e.g. access technologies for data delivery, location available etc., this having been gathered from the various operators and stored in the database 20 so as to be accessible to the content broker 8 at steps S4.3 and S4.5). In another arrangement, the criteria entered in region 307 can be transmitted to the content provider 8 and used by the GUI software component 203 to pre-filter available operators on the basis of the delivery access technologies offered thereby, so as to ensure that the operators presented to the user in the drop down list match the specified delivery options. Turning back to FIG. 1, it will be appreciated that there may be two or more different network operators, as represented by network portions N1, N2.

As described above the content provider 6a specifies a budget for sponsoring delivery of content, and this is used by the content broker 8 in order to provide an evaluation of the various network operators. Of particular interest to the content provider 6a is the cost of sponsoring content provision—e.g. the most and least expensive operators in relation to delivery of any given content item(s). Each network operator has one or more delivery plans associated therewith, which for example apply in respect of different subscribers and typically vary as a function of subscription; for example, in respect of an exemplary network operator, one plan, A, might specify 1€/Mbyte, whilst another plan, B, might specify 0.25€/Mbyte.

Accordingly and referring back to FIG. 2, responsive to submission of data from the content provider 6a (via selection of button 313, the result of which is encapsulation and transmission of the data entered in regions 301, 303, 307 and 311, as indicated by step S4.9 in FIG. 4), the delivery evaluation software component 205 is arranged to process the various delivery plans in respect of the content specified in editable region 301 so as to identify the number of deliveries that can be supported by the budget for each of the operators.

In detail, the delivery evaluation software component 205 retrieves data indicative of the URL(s) entered in region 301 and accesses the terminal corresponding to the or each URL, as indicated in step S4.11 so as to identify or verify the amount of data accessible from the URL (this having been optionally entered by the content provider 6a; access in respect of only one URL is shown for clarity). Such identification or verification can involve downloading the content to the content broker 8 or reviewing data indicative of the file size stored on the corresponding web server. In either case, data indicative of the amount of data are returned to the delivery evaluation software component 205 at step S4.13 (it will be appreciated that steps S4.11 and S4.13 are not essential to embodiments the invention, since they merely serve for verification purposes).

Once the amount of data that would be transmitted to a user in response to selection of a link corresponding to the URL has been established, the delivery evaluation software component 205 evaluates the number of delivery events that can be supported for the budget specified in region 307 for each operator selected by the content provider in region 311, on the basis of the operator data retrieved from the database 20 at step S4.5. One exemplary evaluation method will now be explained with reference to the two data plans described above (A: 1 €/Mbyte and B: 0.25€/Mbyte), and for the case where the budget specified is 100€. Considering firstly plan A, assuming the amount of data available from the URL is 1.5 Mbyte, the delivery evaluation software component 205 identifies that the delivery cost for each individual data access attempt is 1.5€; accordingly the number of deliveries that can be sponsored is approximately 66. Considering next plan B, the delivery cost for each individual data access attempt is determined to be 0.38£; accordingly for a budget of 100£, the number of sponsorable deliveries is approximately 264.

Having evaluated the number of sponsorable deliveries for each operator (step S4.15), the delivery evaluation software component 205 generates output indicative of the number of delivery events per operator, and transmits this to the content provider (step S4.17); an example of the output is shown in Table 1:

TABLE 1

| OPERATOR | SPONSORED DATAPLAN TYPE | NO. DELIVERIES |
|---|---|---|
| Vodafone, DE | A, B | 66, 264 |
| Cingular | C | 467 |
| Orange | D | 200 |
| Total | | 707, 912 |

Whilst the foregoing example assumes that the content provider 6a is sponsoring all (n %, where n=100%) of the delivery costs for individual data access requests, the content provider 6a can alternatively sponsor a proportion of the delivery costs (n %, where n<100% and is specified by the content provider via the user interface 300); in either case the delivery evaluation software component 205 is arranged to evaluate the number of deliveries supported by the budget on the basis of the percentage n according to the evaluation process described above.

The foregoing assumes selection of a given link (e.g. in search results) to result in a request for data access from a single URL; however, and as described above, the URL might contain one or more click-through links. Accordingly the delivery evaluation software component 205 can estimate the number of web pages that are likely to be accessed via click-through links, and this estimate can be combined with the size of data accessible from each respective click-through link so as to determine the amount of data that might be accessed downloaded by a given subscriber. In one arrangement the characteristics are combined so as to generate an overall download requirement, as follows:

> Download Size of directly accessible web page+No. inter-web page click-through links*$P_1$*Average size of inter-web page click-through links+No. external web page click-through links*$P_2$*Average size of external web page click-through links $P_1$ and $P_2$ are probability values indicative of the likelihood of users accessing the click-through links. Many content providers maintain statistics indicative of access to internal and external links, so this information can be provided by the content providers at the time of submitting the storage and/or transmission criteria. Alternatively the delivery evaluation software component 205 can apply estimates for the respective probabilities, in the form of discrete values (such as, if there are eight inter-web click through links (so eight layers of clicks), the probability of accessing level one click is 75%, the probability of accessing level two click is 50%, the probability of accessing level three click is 30%; the probability of accessing level four click is 25%; the probability of accessing level five click is 20% etc.) or in the form of a continuous function. Once the magnitude of the download has been established, this can be used to evaluate the number of individual data access requests that can be supported by the content provider's budget.

Returning to FIG. 4, the data indicative of the number of data access deliveries that will be supported by the budget specified in region 303 can be presented to the content provider 6a within a web page (not shown). The web page can additionally include a "Confirm" button, which, when pressed, causes the data received at and evaluated by the content broker 8 to be stored in the database 20 for use in relation to subsequent data access requests. In addition the web page can include a "Modify Details" button, which, when selected, causes the user interface 300, complete with the data previously entered by the content provider 6a, to be retransmitted thereto. In addition, the web page can include a "Start Again" button, which, when selected, causes the content provider to return to step S4.7. Selection of any of these buttons is shown schematically by step S4.17 in FIG. 4.

Assuming the content provider 6a to select the "Confirm" button at some stage, this causes the account updating software component 407 to store the data as a record R in the database 20 (or locally in the content broker 8, or in a distributed storage system (not shown)), the record being for use in serving subsequent requests for data access from terminals such as terminals 2, 4 shown in FIG. 1. FIG. 5 shows as example of three records Ra, Rb, Rc, one corresponding to each of the content providers 6a, 6b, 6c.

Applications of Some Embodiments of the Invention

Figure 6:
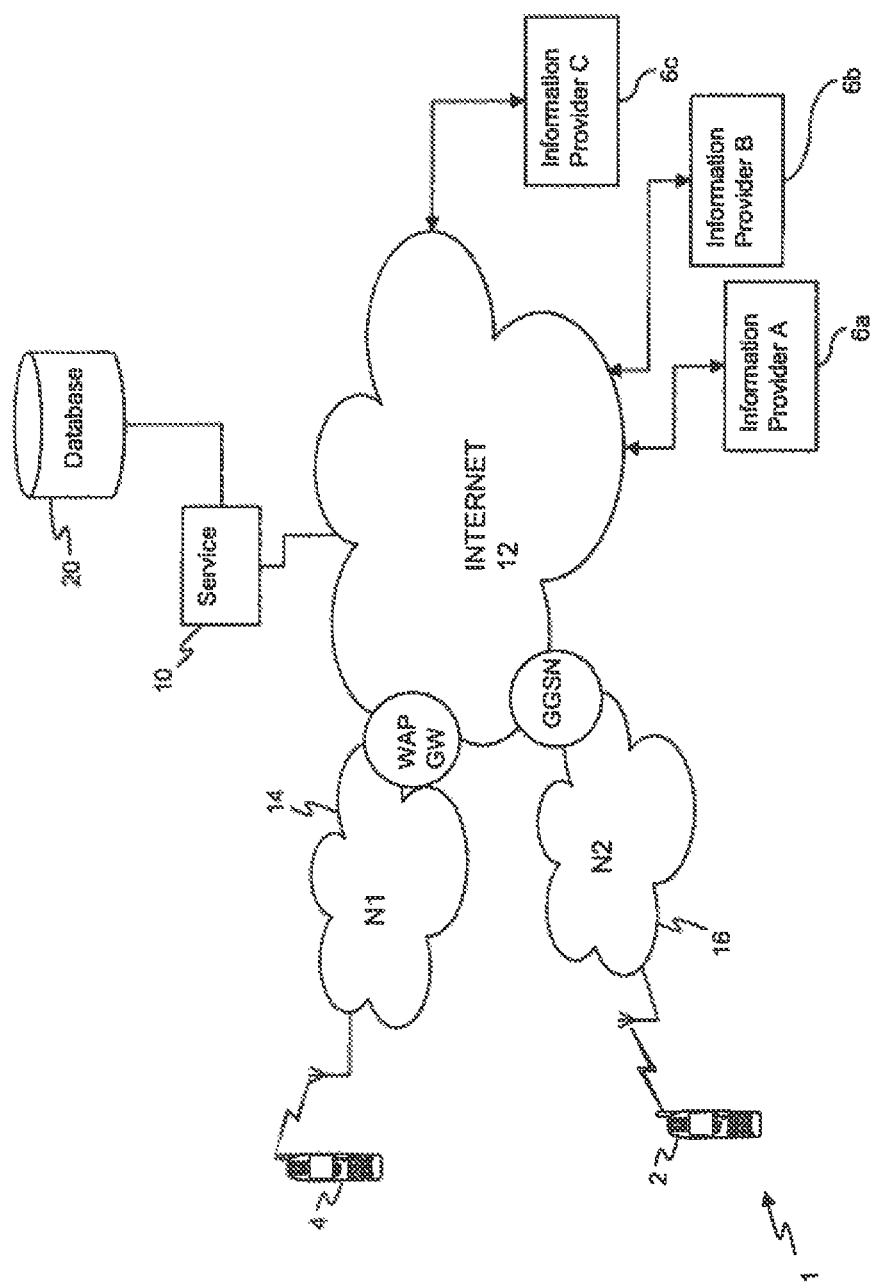
FIG. 6 is a schematic block diagram showing a distributed information system comprising a service for accessing the data stored in FIG. 5.

In the foregoing embodiments a content provider is described as sponsoring a URL with little context in relation to the conditions in which the sponsorship applies; in preferred applications of embodiments of the invention the sponsorship applies in relation to access requests that are received via a bespoke service 10 such as that shown in FIG. 6.

One example of a suitable service 10 is a portal arranged to filter the records Ra, Rb, Rc so as to identify those content providers 6a, 6b, 6c whose data are free to access by the terminals 2, 4. As described above and shown in FIG. 5, each content provider 6a, 6b, 6c selects (an) operators in respect of which delivery of data to terminals is to be sponsored by the content provider, resulting in a record Ra, Rb, Rc being populated in the database 20; the records Ra, Rb, Rc contain, inter alia, data indicative of the selected operator(s), and this can be used to populate a "free to access" list. In one arrangement the list could be compiled in response to a request received from a terminal 2, 4: the portal 10 could extract the identity of the operator serving the requesting terminal 2 and use this to filter the records Ra, Rb, Rc. The output of this process would therefore be a list of URLs that are free for that particular subscriber to access, given their particular network operator. A suitable name for such a portal could be "free mobile links. com" and the portal could be embodied as a conventional web server with an interface configured to facilitate database queries.

Alternatively service 10 could be a search engine, which is arranged to identify those content providers 6a, 6b, 6c that are registered as having content corresponding to keywords submitted by the terminal as part of a search request. In addition to listing the operator(s) via which access to content is free to terminals 2, 4, the records Ra, Rb, Rc can optionally include a further field (not shown), which specifies an amount of resource that the content provider is willing to allocate to offset delivery of their content via non-listed operators. The search engine could respond to search requests by means of a search results list of content providers having content relevant to the search query; items on the results list are conveniently categorised as "free" or "subsidised", where "free" corresponds to content providers listing the operator from which the request was received in the record Ra, Rb, Rc and "subsidised" corresponds to content providers not listing the operator from which the request was received in the record Ra, Rb, Rc, but in respect of which an amount of resource has been specified in the further field (for use in subsidising access to their content).

As a yet further example, service 10 could be a web site comprising embedded links to content providers 6a, 6b, 6c; the links could be displayed so as to identify content providers whose content is free to access differently to content providers whose content is partly or non-subsidised in dependence on the operator from which the request was received and the data stored in the database 20 as described above.

Additional Details and Modifications

It will be appreciated that steps S4.3 and S4.5 are optional, in so far as the operator data can be cached in the content broker 8 for use in future access requests from other content providers.

Whilst in the above embodiments it is envisaged that sponsorship relates to delivery of data to a mobile terminal, the search results could alternatively be transmitted to a search results service. Accordingly the sponsorship could additionally or alternatively relate to delivery of data within a fixed network, or to provision of access to Wireless Local Area Network (WLAN) services for certain selected search results only.

Whilst it is preferably that the network location and key words are related, any given content provider can specify a link to a network location that is unrelated to the keywords (e.g. a content provider providing information in relation to the key words "hotels London" can specify links to network locations unrelated to these keywords).

By way of clarification, the term "sponsored access" is to be understood as including (but not limited to), wholly or in part, the costs of associated with accessing data from the network location associated with the content provider.

The above embodiments are to be understood as illustrative examples of the invention. Further embodiments of the invention are envisaged. It is to be understood that any feature described in relation to anyone embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method comprising:
   accessing a network location to estimate an amount of data accessible through a web page at the network location, the estimate based on a probability of additional web pages being accessed through links on the web page and an average size of each additional web page, wherein the links are one of inter-web page links, external web page links, and a combination of inter-web page links and external web page links;
   receiving a quantity of resources to be allocated for delivery of the data;
   using a delivery rate specified by a communications service provider to deliver the data, the estimated amount of the data, and the allocated quantity of resources to identify a number of individual access requests initiated by a mobile device for the data that can be offset by the allocated quantity of resources when the data is delivered by the communications service provider; and
   outputting data indicative of the identified number of individual access requests.

2. The method according to claim 1 and further comprising using a different delivery rate and a different allocated quantity of resources to identify a further number of individual access requests for the amount of data that can be offset by the different allocated quantity of resources.

3. The method according to claim 2 and further comprising ordering the data indicative of the identified number of individual access requests on the basis of the number and the further number of individual access requests.

4. The method according to claim 2, wherein the different delivery rate relates to the communications service provider.

5. The method according to claim 2, wherein the different delivery rate relates to a different communications service provider.

6. The method according to claim 1, wherein estimating the amount of data includes weighting the amount of data according to the size of at least one data element accessible from the network location.

7. The method according to claim 1, wherein estimating the amount of data includes weighting the amount of data according to the size of a predetermined number of data elements accessible from the network location.

8. The method according to claim 1, wherein estimating the amount of data includes weighting the amount of data according to the type of a web page link.

9. The method according to claim 1, wherein the delivery rate comprises a predetermined delivery rate.

10. The method according to claim 1 and further comprising deriving the delivery rate from a data plan associated with the communications service provider.

11. The method according to claim 10 and further comprising retrieving the data plan from a storage system using an identifier associated with the data plan.

12. The method according to claim 1 and further comprising receiving the estimate and the allocated quantity of resources through a user interface accessible by a content provider associated with the network location.

13. The method according to claim 12 and further comprising receiving selection criterion relating to the data accessible from the network location for use in serving a request for data from the network location.

14. The method according to claim 13 and further comprising:
   receiving data indicative of a first bid amount corresponding to the selection criterion, the first bid amount and selection criterion corresponding to a set of data accessible through the network location;
   generating a second bid amount in dependence on the first bid amount and an amount of data associated with the set of data accessible through the network location; and
   storing the generated second bid amount and search term corresponding to the selection criterion in a storage system.

15. The method according to claim 14, and further comprising generating the second bid amount to account for an amount of data corresponding to at least one data item accessible from the network location.

16. The method according to claim 1, wherein the communications service provider comprises a mobile communications service provider.

17. The method according to claim 1 and further comprising serving the identified number of individual access requests.

18. The method according to claim 1 and further comprising operating based on the identified number of individual access requests.

19. A non-transitory computer readable medium storing instructions, which when executed by a processor, cause the processor to perform operations comprising:
   accessing a network location to estimate an amount of data accessible through a web page at the network location, the estimate based on a probability of additional web pages being accessed through links on the web page and an average size of each additional web page, wherein the links are one of inter-web page links, external web page links, and a combination of inter-web page links and external web page links;
   receiving a quantity of resources to be allocated for delivery of the data;
   using a delivery rate specified by a communications service provider to deliver the data, the estimated amount of the data, and the allocated quantity of resources to identify a number of individual access requests initiated by a mobile device for the data that can be offset by the allocated quantity of resources when the data is delivered by the communications service provider; and
   outputting data indicative of the identified number of individual access requests.

20. The non-transitory computer readable medium according to claim 19, wherein estimating the amount of data includes weighting the amount of data according to the size of at least one data element accessible from the network location.

21. The non-transitory computer readable medium according to claim 19, wherein estimating the amount of data includes weighting the amount of data according to the size of a predetermined number of data elements accessible from the network location.

22. The non-transitory computer readable medium according to claim 19, wherein estimating the amount of data includes weighting the amount of data according to the type of a web page link.

23. The non-transitory computer readable medium according to claim 19 and further comprising deriving the delivery rate from a data plan associated with the communications service provider.

24. A system comprising
a processor coupled to a bus;
a network interface coupled to the processor through the bus; and
a memory coupled to the processor through a bus, the memory storing instructions to cause the processor to:
access a network location through the network interface to estimate an amount of data accessible through a web page at the network location, the estimate based on a probability of additional web pages being accessed through links on the web page and an average size of each additional web page, wherein the links are one of inter-web page links, external web page links, and a combination of inter-web page links and external web page links;
receive a quantity of resources to be allocated for delivery of the data;
use a delivery rate specified by a communications service provider to deliver the data, the estimated amount of the data, and the allocated quantity of resources to identify a number of individual access requests initiated by a mobile device for the data that can be offset by the allocated quantity of resources when the data is delivered by the communications service provider; and
output data indicative of the identified number of individual access requests.

\* \* \* \* \*